United States Patent [19]

Ferraro et al.

[11] 4,192,298
[45] Mar. 11, 1980

[54] BREATHING APPARATUS WITH IMPROVED REGULATOR PARTICULARLY FOR UNDER WATER USE

[75] Inventors: Lugi Ferraro; Gianni Beltrani, both of Genes, Italy; Jacques Gass, Villeneuve-Loubet; Bernard Trochon, Carros-le-Neuf, both of France

[73] Assignees: La Spirotechnique Industrielle et Commerciale, France; Technisub S.p.A., Genoa, Italy

[21] Appl. No.: 842,330

[22] Filed: Oct. 11, 1977

[30] Foreign Application Priority Data

Oct. 13, 1976 [IT] Italy ............................ 12838 A/76

[51] Int. Cl.$^2$ .................. A62B 7/04; B63C 11/16; B63C 11/22
[52] U.S. Cl. ................... 128/205.24; 137/DIG. 9; 137/494; 137/505.25; 137/484.4
[58] Field of Search ........... 128/142.2, 142 R, 147, 203; 137/494, 505.25, 484.4, DIG. 9

[56] References Cited

U.S. PATENT DOCUMENTS

| 3,362,429 | 1/1968 | Volsk | 137/494 |
|---|---|---|---|
| 3,920,033 | 11/1975 | Ferrando | 128/142.2 X |
| 4,015,630 | 4/1977 | Contreras | 128/142.2 X |
| 4,041,977 | 8/1977 | Matsvno | 128/142.2 X |

FOREIGN PATENT DOCUMENTS

| 1216484 | 4/1960 | France | 137/505.25 |
|---|---|---|---|
| 1355755 | 2/1964 | France. | |
| 2299211 | 8/1976 | France. | |
| 454822 | 10/1936 | United Kingdom. | |
| 781835 | 8/1957 | United Kingdom. | |
| 783565 | 9/1957 | United Kingdom. | |
| 858603 | 1/1961 | United Kingdom. | |
| 898468 | 6/1962 | United Kingdom. | |
| 935911 | 9/1963 | United Kingdom | 137/DIG. 9 |
| 1485628 | 9/1977 | United Kingdom. | |

Primary Examiner—Henry J. Recla
Attorney, Agent, or Firm—Young & Thompson

[57] ABSTRACT

This invention relates to breathing apparatus specially suited to submerged use, of the kind comprising a two-stage pressure reducer whose first stage is connected to the outlet valve of the diving cylinder and is responsible for the reduction from high pressure to medium pressure, while the second stage is associated directly with the mouthpiece and supplied it with air for respiration in response to each inhalatory suction from the user which exceeds a minimum threshold value termed the lifting suction.

According to the invention, the first stage includes structure for adjusting the medium pressure, which has a member for direct manual operation which is mounted to be easily accessible and which can be operated by the user even when diving, so that the medium pressure can be adjusted whenever the lifting suction becomes too great, or whenever the effect of changes in the operation of the first stage is to alter it, or before diving in shallows.

This first stage may comprise a throttling valve which is loaded by a spring, and the adjusting structure may include a screwed knob which acts on the members for adjusting the setting of the spring.

1 Claim, 5 Drawing Figures

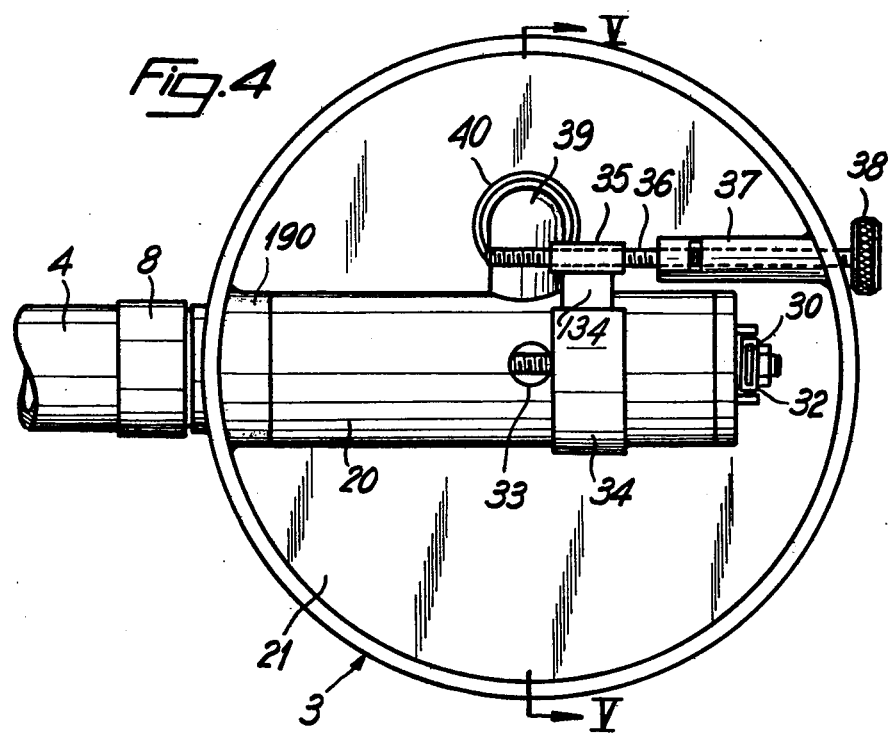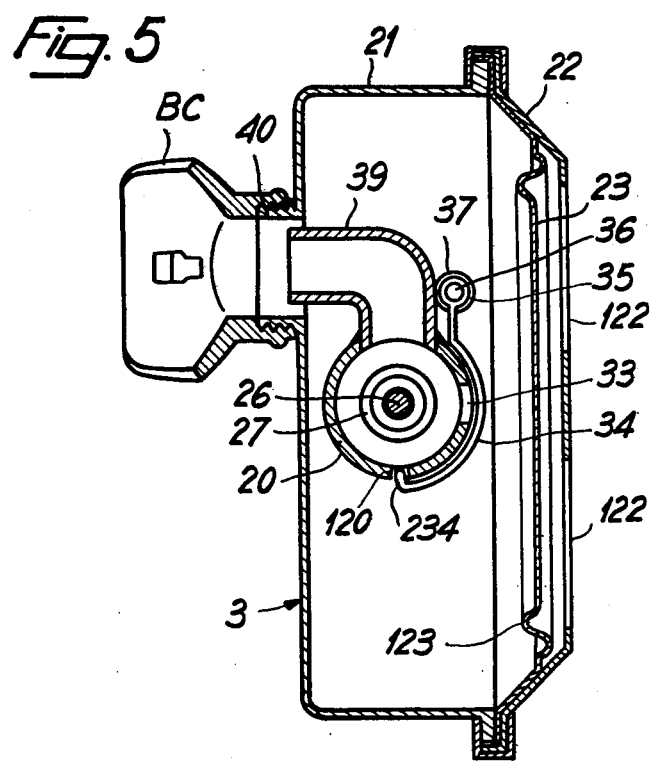

BREATHING APPARATUS WITH IMPROVED REGULATOR PARTICULARLY FOR UNDER WATER USE

BACKGROUND OF THE INVENTION

In a breathing apparatus, be it for surface or underwater use, what is usually referred to as the "regulator" or "demand valve" or sometimes as the "pressure reducer" is a group of automatic valves which acts as an intermediate stage between a cylinder or cylinders which supply compressed air and a mouthpiece of the breathing apparatus itself, which is generally referred to as a demand type breathing apparatus. Hereinafter the expression "pressure reducer" will be used for this valve group. Broadly speaking, pressure reducers can be divided into two categories, namely single-stage and two-stage reducers, according to whether the said group consists of one valve or two. In the latter case, the first stage consists of an automatic valve which is mounted directly on the outlet from the cylinder and which is adapted to bring about a reduction to what is termed a "medium pressure", which is generally around 8 bars above ambient pressure, while the second stage, which is usually associated with the mouth piece, consists of a valve to which the medium pressure is applied and which reacts in a variable and complex fashion to respiratory suction from the user in order to ensure that the mechanism of breathing is subject to the minimum fatigue.

However, these known two-stage pressure reducers have disadvantages both at the medium pressure stage and at the stage associated with the mouthpiece. In the second stage, it is a familiar fact that the hermetic closure of the valve member on its seating is brought about by the slight predominance which an opposing spring has over the pressure exerted on the valve member by the air at medium pressure. During manufacture and setting, and to avoid the leaks which might eventually occur, the medium pressure is held to lower levels than is necessary, the consequence of which is that the force required to lift the valve member is substantially increased. In practice, the medium pressure never remains constant over time, this being the result of changes which, although minimal, affect the operation of the first stage and which are due to friction, distortion of the springs which decide the valve setting, distortion of the sealing joint which forms the seating in the valve nozzle, and other causes.

Given that, in time, these changes could result in air leaks, the medium pressure, which is set only once and almost always in the course of manufacture, is adjusted to allow the spring a marked predominance, which in the final analysis means that an excessive force is required, to lift the valve member, this being of the order of several grammes per square centimeter in many commercially available pressure reducers.

What is more, this disadvantage, namely the fixed setting, meaning by this a setting which can only be made in the workshop or when the pressure reducer is being manufactured or repaired, prevents the level of the medium pressure from being increased, as may be necessary in certain specific working conditions or at great depths to procure a higher throughput of air and in order better to overcome the increase in friction which is caused when the air inhaled is of greater density. This obviously implies that the setting should be capable of being changed in use by a user who is going deep.

As regards the second stage of known pressure reducers, it is necessary to call to mind the characteristic structure of these members, in which a diaphragm box carrying the tube for connection to the mouthpiece holds the cartridge for the medium-pressure output valve, which has a tube for connection to the flexible medium pressure connector which projects out of the box. The air passing through this valve is admitted into the diaphragm box in various ways and in the box there also operates a sensitive lever member which reacts to movements of the diaphragm. The latter flexes at the operative threshold of inhalatory suction and acts correspondingly when the spring-loaded valve mounted inside the cartridge opens. In general, the air, whose flow is throttled as it passes through the said valve mounted in the cartridge, is conveyed into the box through a vent hole situated in the cartridge itself and may even be guided towards the mouth of the tube connecting up with the mouthpiece.

Depending on the position of this opening and of the means for guiding the air which may possibly be associated with it, the pattern of the dynamic fluid pressures within the box and against the diaphragm may be considerably altered, to the point of having substantial, and even opposing, effects on the behaviour of the diaphragm and thus on the reaction of the second stage to the inhalatory suction.

To be more exact, as is once again well known, if the said opening is allowed to open into the box haphazardly (and if the common case where it is even turned towards the diaphragm is ignored) the depression caused by inhalation may be followed by an overpressure in the box, as a result of the introduction of an excess of air which flows through the said opening from the medium pressure valve. The result is that in the course of one and the same inhalation phase the said valve, instead of opening smoothly or regularly and continuously, opens and closes several times in an intermittent fashion at a rate which may be as much as several cycles per second, which in substance means that the diaphragm operates under vibratory conditions.

Of course, as is generally the case in many other servo-control devices, the vibrations depend on a large number of operating parameters.

In comparison with ideal conditions when the reducing valve in the second stage opens continuously, this intermittent throughput results in a sort of "braking" during inhalation which proves most unpleasant for the user.

In addition, operating conditions may occur which are diametrically opposed to this "braking" when the outgoing flow from the said opening in the cartridge of the pressure reducer is guided axially by the opening itself towards the mouth of the inhalation orifice of the mouthpiece. This being the case, as soon as there is the least sign of inhalatory suction (of a level higher than the operative threshold of suction), the effect of the flow of air emerging from the said opening directly supplements the suction itself, as a result of the Venturi effect, and thus boosts its effect on the flexing of the diaphragm to the limiting conditions where the said Venturi effect persists even beyond the end of the inhalatory movement which initiated it. Under these conditions, the outflow produced has a tendency to continue indefinitely and to bring it to an end would require an opposing pressure which may be produced by for example moving the tongue towards the orifice of the mouthpiece or by closing the glottis, given that under these conditions where outflow is self-maintaining it is no longer necessary to generate inhalatory forces since the pressure reducer itself injects air into the lungs at a more or less high pressure.

In the case instanced in the previous paragraph, the inhalatory force required is reduced to zero but control of the outflow becomes a rather complicated matter. However, the disadvantage of the self-maintaining nature of the flow after it has been started has been corrected in a fairly simple way by providing one or more additional air outlets which are orientated in the opposite direction from the elbow or pipe which directs the main jet into the orifice of the mouthpiece.

However, the simplicity of this solution, which has been adopted in an attempt to remedy the above disadvantage, is not matched by corresponding simplicity and reliability in operation. In particular, the expedient of reducing the injection or Venturi effect by providing compensating ports or other openings in the opposite direction from the Venturi, is very much dependent on dynamic flow conditions in the diaphragm box and is found to be very sensitive even to tiny changes in a large number of parameters, such as distortion, defects in the sealing joint for the valve in the second stage, variations in the medium pressure, and others.

To remedy the drawback represented by the dependence of the injection effect on dynamic flow conditions, many manufacturers have thought it preferable to reduce the injection effect virtually to nothing by means of very large compensating openings. This however results in an outflow which is far from meeting physiological respiratory requirements.

SUMMARY OF THE INVENTION

From one aspect, the present invention provides an improvement to the two-stage pressure reducers for breathing apparatus which have just been described, by providing a regulator for the counteracting flow which can be operated by the driver when submerged, the regulator being formed in essence by an obturating or deflecting member which, by means of a manually operated control, cuts off the counteracting flow to a greater or lesser degree, thus making it possible for the self-induction effect of the outgoing flow to be varied at will. Thus, by this simple manual adjustment, it is possible to correct in turn all the causes of misfunctioning or inappropriate functioning and even, depending on requirements at the time, to choose between "easy", "neutral" or "gradual" operation without having to employ different types of construction.

From another aspect, and referring to the analysis which has just been made, the invention also makes provision for an improvement to the second stage of the pressure reducer by providing it with control means to allow the submerged diver himself to adjust the setting of the medium pressure whenever required. The advantages of the fact that the setting can be adjusted whenever required will be clear from the description which has just been given and in any case will be obvious to the man skilled in the art.

BRIEF DESCRIPTION OF THE DRAWINGS

The features of the invention and the advantages which it affords will be better appreciated from perusal of the following description of a preferred embodiment, which is given by way of entirely non-limiting example with reference to the accompanying drawings, in which:

FIG. 4 is a front view of the valve of FIG. 3 on line IV—IV of FIG. 3, that is to say the valve lacks the diaphragm and the corresponding cut-away cover, and FIG. 5 is a sectional view of the same valve on line V—V of FIG. 4.

DETAILED DESCRIPTION OF PREFERRED EMBODIMENTS

Figure 1:
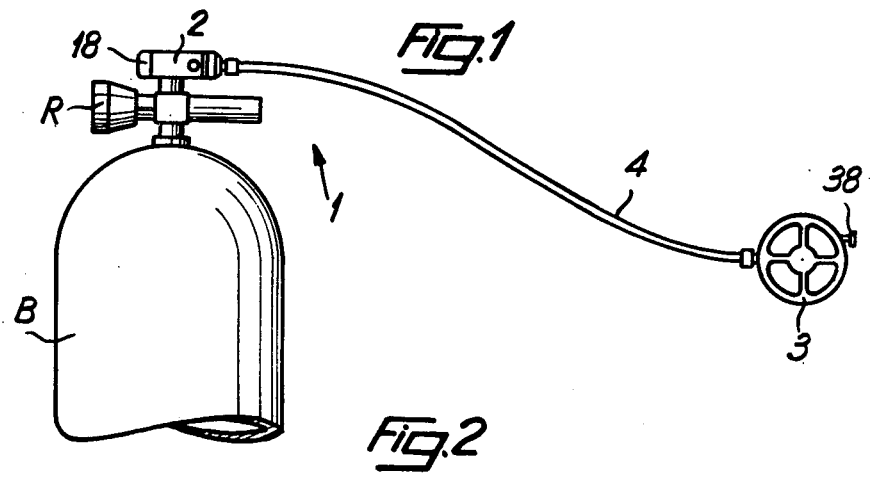
FIG. 1 is an elevation view, which is given by way of illustration, of a two-stage pressure reducer with the first stage fitted to the outlet valve of a diving cylinder and the second stage fitted to the mouthpiece for the user.

Referring now to the drawings, reference 1 refers in general to the two-stage pressure reducer of a breathing apparatus specially designed for amateur or professional divers. Reference 2 designates the first-stage or medium pressure valve of the said reducer and this is connected to the outlet valve R of a cylinder B which contains compressed air or any other breathable gas. 3 is a general reference for a low-pressure valve which is connected to valve 2 by a flexible hose 4, a mouthpiece BC (FIG. 5) being fitted directly to the outlet of the valve itself.

Figure 2:
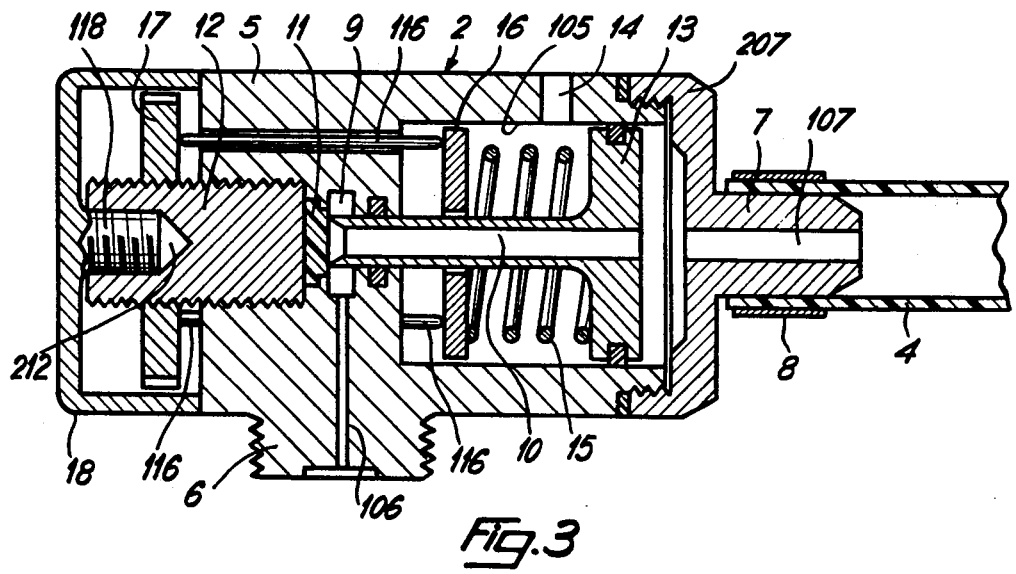
FIG. 2 is a longitudinal section through an embodiment of first-stage valve which has an arrangement for adjusting the medium pressure which is accessible to the user.

In a preferred embodiment, the first-stage valve 2 has a hollow valve body 5 which has a threaded spigot 6 for connection to the outlet valve R of the cylinder and an outlet tube 7 for connection to one end of the flexible hose 4 by means of a suitable connecting member 8. In FIG. 2, this connecting member is shown, for the sake of simplicity, in the form of a clamping collar 8. It is however clear that in practice the connection between the hose 4 and the tube 7 will need to be made with suitable means which allow, inter alia, for the fairly high level of the medium pressure of the gas within the hose.

The valve body 5 contains a space 9 in which moves the exit nozzle of a tubular rod 10, the said nozzle coming into sealed abutment against a seating or gland 11 which is inset in the body itself and which is held in place by a plug 12. Also opening into the space 9 is the admission duct 106 from the spigot 6 for connection to the high pressure. The connection 7 has an outlet duct 107 for the medium pressure air, and a skirt 207 for connecting it to the end of the valve body 5 to correspond with a chamber 105 in which a piston 13 secured to the tubular rod 10 of the valve member slides while maintaining a seal. On the side on which the rod of piston 13 is situated, chamber 105 communicates with the exterior through a hole 14 in the body 5. On the same side as that on which this hole is situated, a coil spring 15 operates in compression between piston 13, on whose rod 10 it is engaged, and an adjusting disc 16 which is mounted to slide on this same rod. In opposition to the force set up by the compressed spring 15 disc 16 is held forward by three adjusting pins 116, which are arranged in a triangle and slide in three holes formed in the body 5. These pins project beyond the end part of the body and abut against one side of an adjusting knob 17 which is screwed onto the projecting portion of the threaded rod or plug 12. A protective cap 18 has on the inside a central threaded boss 118 which screws into a blind hole 212 in the plug 12. This cap, which has to be removed to gain access to the housing for the knob 17, serves to protect the knob itself against accidental rotation. Nevertheless the said cap 18 can be removed very easily, while the said knob 17 is provided with a knurled or fluted band which makes it easy to operate even for a user who is himself underwater.

By virtue of the accessibility of the knob 17, the setting can be made (even at depth) by firstly screwing the knob down until there is a slight leakage from the second stage, and then by unscrewing the knob slightly intil the leak caused previously just stops. In this way the force needed to lift the piston of the valve member in the second stage is reduced to a minimum which is scarcely greater than a value of zero.

This facility for adjusting the medium pressure, which can be made use of by the user (if necessary while submerged), forms one of the main features of the improvement made by the present invention. The advantages which it affords are many and evident: errors arising from wear and distortion are easily corrected, and it is possible to increase the throughput of inhaled air in case of deep dives or in shallows, not forgetting of course the advantage that the lifting force can be reduced to a minimum.

As has already been stated in the introduction to the present description of the drawings, the other main feature of the invention lies in the possibility which exists of making a direct adjustment, by a manual operation, to the counter-pressure flow in the second stage of the two-stage pressure reducer.

Figure 3:
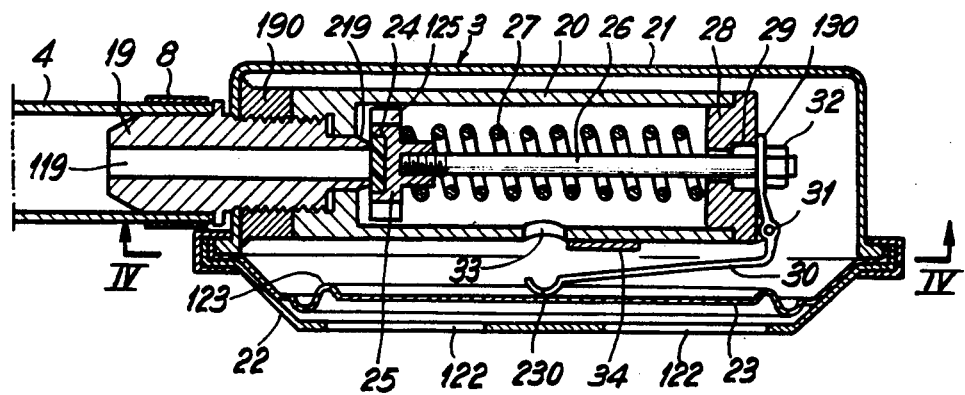
FIG. 3 is a longitudinal section through an embodiment of second-stage valve which has a manual arrangement for adjusting the counteracting flow, once again conforming to the improvement made by the present invention.

FIGS. 3, 4 and 5 of the accompanying drawings illustrate a preferred embodiment of valve for the second stage of the reducer. This valve, which has already been mentioned by its general reference 3, continues from a tube 19 for connecting to the flexible hose 4, the considerations applying to this tube being the same as those already set forth as applying to the similar tube belonging to the high pressure valve 2. The said tube 19 screws into a cartridge 20 and into a threaded sleeve 190 soldered to the inside of a box 21. As can clearly be seen by examining FIG. 3, tube 19 thus projects outside the said box, while the cartridge 20 extends diametrically in a fixed position on the inside of the box.

The box 21 is in the shape of a squat cylinder one of whose ends is closed off by a cover 22 which at the same time clamps and seals the edge of a diaphragm 23 which forms the member sensitive to the pressure differential between the exterior and the compartment of the box which lies on the outside of cartridge 20. The cover 22 contains wide cut-outs 122 arranged in a broadly spoke-like pattern which allow there to be extensive contact between the diaphragm and the external medium i.e. the water at the depth level in question.

The passage 119 in tube 19 terminates at an outflow nozzle 219, against which presses a sealing gland 24 on the piston 25 of a valve member, the piston sliding in the cartridge 20 and being provided with cut-outs 125 to allow passage to the respiratory gas which is fed into its housing. The piston is secured to a rod 26, over which is fitted a compressed coil spring 27 which holds the seating 24 closed and sealed against the supply nozzle 219. The threaded end of this rod projects through the end 28 of the cartridge 20, while maintaining a seal, via an axial hole in which a seal is provided by an annular gland 29.

When an inhalatory suction greater than what is termed the "operating" threshold is applied, the diaphragm 23 reacts by bowing towards the inside of the box, in which it is assisted by concentric corrugations formed in it. This reaction is transmitted to the valve member 24 by a control arrangement formed by a bell-crank lever 30 which is mounted to pivot at its angle 31 on the end 28 of the cartridge. This lever touches the center 230 of the diaphragm 23 with one of its ends, while its other end terminates in a fork 130 which fits round the projecting part of the rod 26 and which abuts against an adjusting nut 32. In this way, opposite the gland or pad 24, an outflow or throughput of respiratory gas at ambient pressure takes place in direct response to the said inhalatory suction. The outgoing air passes from the cartridge 20 into the compartment of housing 21 through an opening 33, which is preferably arranged facing the diaphragm 23.

In accordance with another feature of the invention, the jet leaving this opening may be controlled manually, and preferably gradually, by means of a shutter 34 which is mounted to slide along cartridge 21 on the outside and which is secured to an internally threaded sleeve 35 mounted at the end of an extension 134 of the shutter itself. In the said sleeve 35 is engaged an adjusting screw 36 which is mounted to turn but not slide in a socket 37 attached to the inside of the box 21. The said screw projects from the box at one end and an operating knob 38 is attached to this end.

As is well known, the jet leaving the port 33 is solely what is termed a counter-pressure jet, while the main jet is directed through an angled duct or pipe 39 and directly to the outlet orifice of a tube 40 connecting up with the mouth-piece BC. Thus, the reduction in pressure by Venturi effect which can be brought about in the box 21 by the jet from pipe 39 is compensated for by the corresponding jet produced by orifice 33, the amount of which compensation may in addition be adjusted manually by turning the knob 38. Thanks to this opportunity for manual adjustment which the operator has even when submerged, this being one of the main features of the present invention, it is possible to obtain the advantages set forth in the introductory part of the present specification.

In the embodiment which has just been described, the shutter 34 which acts on the counter-pressure jet is in essence an obturating shutter which reduces this jet to a greater or lesser degree and which is guided to slide, but not to turn, by a lug 234 which slides in a groove 120 on the outside of the cartridge 20.

It is clear that the invention is not restricted to this embodiment and that it could in fact be the subject of changes or modifications particularly where required to meet particular practical needs which may occur. In particular, it could equally well be envisaged for the injection effect to be adjusted by means of shutters or other suitable members positioned in front of the supply pipe. As a modification, it is also anticipated that the injection effect could be achieved not with admission ducts but by changing the shape of the box or by various shutters. Incidentally, note should also be taken of the advantage represented by the easy means of getting away from vibratory conditions which affect the supply throughput, should they occur, these conditions having been amply described in the introductory part of the present specification. To do this, it is in fact enough to move the shutter 34, even slightly so as to get away from the critical operating conditions which bring on the oscillatory behaviour.

Consequently, the embodiment which has just been described could be the subject of changes and modifications in particular in view of the innumerable forms which are possible in practice, without thereby exceeding the much larger scope of the invention as defined by the appended claims.

We claim:

1. In a diving breathing apparatus of the two-stage pressure reducing type comprising first stage valve means adapted to be connected to a diving cylinder containing a respiratory gas under high pressure for the reduction of said gas from high pressure to medium pressure, second stage valve means connected to said first stage for the reduction of said gas from medium pressure to breathable pressure, a mouth-piece associated directly to said second stage means, means responsive to each inhalatory lifting suction from the user which exceeds a minimum threshold to open said second stage means to supply respiratory gas to said mouthpiece under breathable pressure, and means to oppose a force to said lifting suction thereby to establish said threshold; the improvement in which the said first stage valve means comprises a valve body having an admission duct receiving said gas under high pressure, throttling valve means in said valve body, spring means biasing said valve means to its open position, a chamber in said valve body, and manually operated control means for adjusting the setting of said spring means, whereby said medium pressure may be adjusted by the user in order to adjust said threshold, said throttling valve means comprising a seating member inserted in said valve body and a piston slidably mounted in said chamber and dividing said chamber into first and second compartments, said spring means being positioned in said first compartment, - said piston having fixed thereon a tubular rod having a bore extending through said rod and said piston and provided at one of its extremities with a nozzle adapted to come into sealed abutment with said seating member, said admission duct communicating with said seating member and the outer side of said nozzle when said nozzle is seated on said seating member, said admission duct communicating with said second compartment through said tubular rod when said nozzle is spaced from said seating member, said control means comprising a knob screwed on a threaded plug secured on said valve body, said plug holding said seating member in place between said plug and said valve body, a disc slidably mounted on said rod and located in said first compartment and a plurality of pins slidably mounted in said body between said knob and said disc and in abutment against them, the aforesaid loading spring means being inserted between said piston and said disc whereby the setting of said spring means and consequently the adjustment of said threshold is obtained by screwing and unscrewing said knob.

* * * * *